United States Patent
Yamamoto

(10) Patent No.: US 7,477,460 B2
(45) Date of Patent: Jan. 13, 2009

(54) IMAGE READING LENS AND IMAGE READING APPARATUS

(75) Inventor: Yoko Yamamoto, Saitama (JP)

(73) Assignee: Fujinon Corporation, Saitama-Shi Saitama (JP)

( * ) Notice: Subject to any disclaimer, the term of this patent is extended or adjusted under 35 U.S.C. 154(b) by 98 days.

(21) Appl. No.: 11/586,662

(22) Filed: Oct. 26, 2006

(65) Prior Publication Data
US 2007/0097522 A1    May 3, 2007

(30) Foreign Application Priority Data
Oct. 28, 2005    (JP)    ............... P2005-314725

(51) Int. Cl.
*G02B 9/34*    (2006.01)
(52) U.S. Cl. ............... 359/781; 359/782
(58) Field of Classification Search ........ 359/781, 359/782
See application file for complete search history.

(56) References Cited

U.S. PATENT DOCUMENTS

| 4,755,028 A | 7/1988 | Moskovich |
| 4,830,476 A | 5/1989 | Aoki |
| 5,900,990 A * | 5/1999 | Konno et al. ............... 359/692 |

FOREIGN PATENT DOCUMENTS

| JP | 11-190820 A | 7/1999 |
| JP | 2002-296499 A | 10/2002 |

* cited by examiner

*Primary Examiner*—Darryl J Collins
(74) *Attorney, Agent, or Firm*—Birch, Stewart, Kolasch & Birch, LLP

(57) ABSTRACT

An image reading lens is provided and includes: in order from an object side of the image reading lens, a first negative lens having a meniscus shape; a second lens having a double-convex shape; an aperture stop; a third positive lens having a meniscus shape with a convex surface on an image side of the image reading lens; and a fourth negative lens having a meniscus shape with a concave surface on the object side.

8 Claims, 19 Drawing Sheets

FIG. 4

| FUNDAMENTAL LENS DATA OF EXAMPLE 1 | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| 1 | -18.66 | 2.98 | 1.84666 | 23.8 |
| 2 | -58.56 | 0.70 | | |
| 3 | 9.23 | 3.49 | 1.75500 | 52.3 |
| 4 | -32.56 | 0.00 | | |
| 5 | (APERTURE STOP) | 1.44 | | |
| 6 | -8.42 | 3.94 | 1.62588 | 35.7 |
| 7 | -7.65 | 2.85 | | |
| 8 | -4.91 | 1.60 | 1.72825 | 28.5 |
| 9 | -9.84 | | | |

FIG. 5

| FUNDAMENTAL LENS DATA OF EXAMPLE 2 | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| 1 | -17.67 | 2.37 | 1.84666 | 23.8 |
| 2 | -44.92 | 0.98 | | |
| 3 | 9.23 | 3.85 | 1.75500 | 52.3 |
| 4 | -41.82 | 0.00 | | |
| 5 | (APERTURE STOP) | 2.02 | | |
| 6 | -8.07 | 3.44 | 1.72047 | 34.7 |
| 7 | -7.30 | 2.35 | | |
| 8 | -4.92 | 1.67 | 1.78472 | 25.7 |
| 9 | -9.11 | | | |

FIG. 6

| | FUNDAMENTAL LENS DATA OF EXAMPLE 3 | | | |
|---|---|---|---|---|
| Si (SURFACE NUMBER) | Ri (CURVATURE RADIUS) | Di (SURFACE SPACING) | Ndj (REFRACTIVE INDEX) | vdj (ABBE NUMBER) |
| 1 | -18.63 | 1.39 | 1.84666 | 23.8 |
| 2 | -55.64 | 0.96 | | |
| 3 | 8.80 | 3.55 | 1.75500 | 52.3 |
| 4 | -37.26 | 0.00 | | |
| 5 | (APERTURE STOP) | 1.48 | | |
| 6 | -9.55 | 4.26 | 1.80400 | 46.6 |
| 7 | -7.50 | 1.74 | | |
| 8 | -4.86 | 2.12 | 1.64769 | 33.8 |
| 9 | -13.48 | | | |

FIG. 7

| | FUNDAMENTAL LENS DATA OF EXAMPLE 4 | | | |
|---|---|---|---|---|
| Si (SURFACE NUMBER) | Ri (CURVATURE RADIUS) | Di (SURFACE SPACING) | Ndj (REFRACTIVE INDEX) | vdj (ABBE NUMBER) |
| 1 | -18.16 | 2.27 | 1.80518 | 25.4 |
| 2 | -55.77 | 0.89 | | |
| 3 | 8.91 | 3.59 | 1.75500 | 52.3 |
| 4 | -38.58 | 0.00 | | |
| 5 | (APERTURE STOP) | 1.64 | | |
| 6 | -8.56 | 3.69 | 1.66680 | 33.0 |
| 7 | -7.45 | 2.37 | | |
| 8 | -4.79 | 1.89 | 1.78472 | 25.7 |
| 9 | -9.28 | | | |

FIG. 8

| | FUNDAMENTAL LENS DATA OF EXAMPLE 5 | | | |
|---|---|---|---|---|
| Si (SURFACE NUMBER) | Ri (CURVATURE RADIUS) | Di (SURFACE SPACING) | Ndj (REFRACTIVE INDEX) | vdj (ABBE NUMBER) |
| 1 | -16.95 | 2.01 | 1.84666 | 23.8 |
| 2 | -45.04 | 0.68 | | |
| 3 | 9.06 | 3.51 | 1.75500 | 52.3 |
| 4 | -34.61 | 0.00 | | |
| 5 | (APERTURE STOP) | 1.77 | | |
| 6 | -8.56 | 3.84 | 1.76200 | 40.1 |
| 7 | -7.69 | 2.29 | | |
| 8 | -4.91 | 1.73 | 1.71736 | 29.5 |
| 9 | -10.02 | | | |

FIG. 9

| | FUNDAMENTAL LENS DATA OF EXAMPLE 6 | | | |
|---|---|---|---|---|
| Si (SURFACE NUMBER) | Ri (CURVATURE RADIUS) | Di (SURFACE SPACING) | Ndj (REFRACTIVE INDEX) | vdj (ABBE NUMBER) |
| 1 | -18.18 | 1.43 | 1.84666 | 23.8 |
| 2 | -47.34 | 1.14 | | |
| 3 | 9.00 | 3.68 | 1.75500 | 52.3 |
| 4 | -39.62 | 0.00 | | |
| 5 | (APERTURE STOP) | 1.68 | | |
| 6 | -9.16 | 4.02 | 1.80610 | 40.9 |
| 7 | -7.43 | 1.85 | | |
| 8 | -4.92 | 1.99 | 1.69895 | 30.1 |
| 9 | -11.92 | | | |

FIG. 10

| FUNDAMENTAL LENS DATA OF EXAMPLE 7 | | | | |
|---|---|---|---|---|
| Si (SURFACE NUMBER) | Ri (CURVATURE RADIUS) | Di (SURFACE SPACING) | Ndj (REFRACTIVE INDEX) | νdj (ABBE NUMBER) |
| 1 | 41.99 | 1.29 | 1.61293 | 37.0 |
| 2 | 5.00 | 0.28 | | |
| 3 | 5.78 | 5.04 | 1.77250 | 49.6 |
| 4 | -171.02 | 0.00 | | |
| 5 | (APERTURE STOP) | 1.35 | | |
| 6 | -16.32 | 4.90 | 1.77250 | 49.6 |
| 7 | -7.61 | 2.95 | | |
| 8 | -6.04 | 0.75 | 1.67270 | 32.1 |
| 9 | -13.80 | | | |

FIG. 11

| | FOCAL LENGTH F OF TOTAL SYSTEM | F-NUMBER | MAGNIFICATION β | VIEW ANGLE 2ω |
|---|---|---|---|---|
| EXAMPLE 1 | 23.4 | 7.0 | -0.165 | 65.4° |
| EXAMPLE 2 | 23.6 | 7.0 | -0.165 | 65.6° |
| EXAMPLE 3 | 23.6 | 7.0 | -0.165 | 65.4° |
| EXAMPLE 4 | 23.6 | 7.0 | -0.165 | 65.4° |
| EXAMPLE 5 | 23.6 | 7.0 | -0.165 | 65.4° |
| EXAMPLE 6 | 23.6 | 7.0 | -0.165 | 65.4° |
| EXAMPLE 7 | 23.5 | 7.0 | -0.165 | 66.0° |

FIG. 12

|  | CONDITIONAL EXPRESSIONS | | | | |
|---|---|---|---|---|---|
|  | (1), (6) | (2), (7) | (3), (8) | (4), (9) | (5), (10) |
| EXAMPLE 1 | -1.42 | 0.42 | 1.90 | 0.06 | 0.12 |
| EXAMPLE 2 | -1.51 | 0.44 | 1.55 | 0.09 | 0.10 |
| EXAMPLE 3 | -1.41 | 0.41 | 0.95 | 0.06 | 0.07 |
| EXAMPLE 4 | -1.45 | 0.42 | 1.55 | 0.07 | 0.10 |
| EXAMPLE 5 | -1.39 | 0.42 | 1.44 | 0.08 | 0.10 |
| EXAMPLE 6 | -1.50 | 0.42 | 1.01 | 0.07 | 0.08 |
| EXAMPLE 7 | -0.40 | 0.31 | 0.63 | 0.06 | 0.13 |

SPHERICAL ABERRATION
F = 7.0

ASTIGMATISM
ω = 32.7°

DISTORTION
ω = 32.7°

SPHERICAL ABERRATION
F = 7.0

ASTIGMATISM
ω = 32.8°

DISTORTION
ω = 32.8°

SPHERICAL
ABERRATION
F = 7.0

ASTIGMATISM
ω = 32.7°

—: SAGITTAL
----: TANGENTIAL

DISTORTION
ω = 32.7°

SPHERICAL
ABERRATION
F = 7.0

ASTIGMATISM
ω = 32.7°

—: SAGITTAL
----: TANGENTIAL

DISTORTION
ω = 32.7°

SPHERICAL
ABERRATION
F = 7.0

ASTIGMATISM
ω = 32.7°

—: SAGITTAL
----: TANGENTIAL

DISTORTION
ω = 32.7°

SPHERICAL
ABERRATION
F = 7.0

ASTIGMATISM
ω = 32.7°

—: SAGITTAL
----: TANGENTIAL

DISTORTION
ω = 32.7°

SPHERICAL ABERRATION
F = 7.0
F-LINE
e-LINE
C-LINE
-0.5mm  0.5mm

ASTIGMATISM
ω = 33.0°
-0.5mm  0.5mm
— : SAGITTAL
---- : TANGENTIAL

DISTORTION
ω = 33.0°
-1%  1%

FIG. 20A g-LINE, e-LINE 0.02μm

ω = 32.7°

C-LINE  -0.02μm

FIG. 20E g-LINE e-LINE 0.02μm

C-LINE  -0.02μm

FIG. 22A
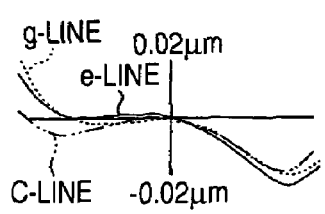
FIG. 22E
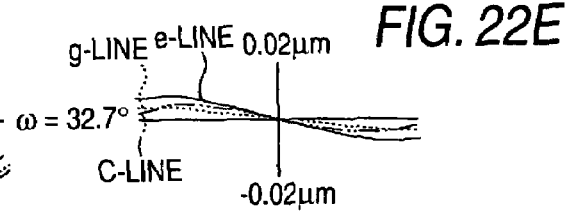
FIG. 22B
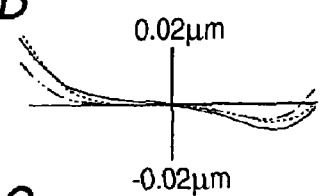
FIG. 22C
FIG. 22F
FIG. 22D
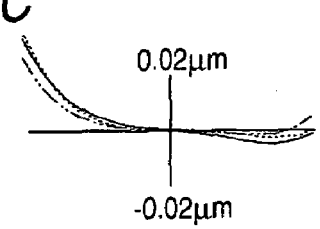
FIG. 22G
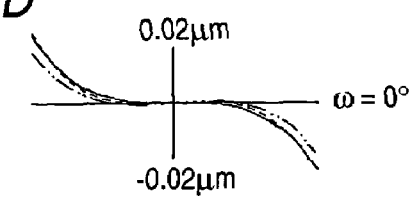

ω = 32.7°

ω = 24.2°

ω = 17.8°

ω = 0°

FIG. 26A
FIG. 26E
FIG. 26B
FIG. 26F
FIG. 26C
FIG. 26G
FIG. 26D
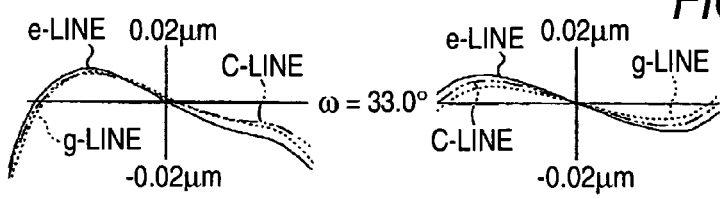
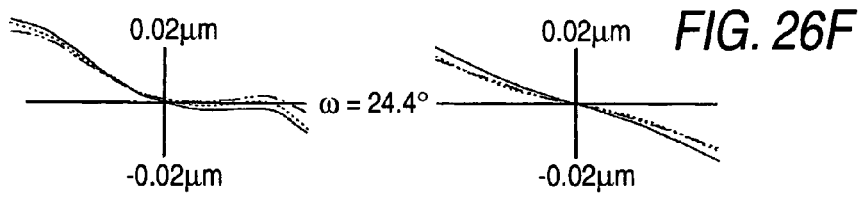
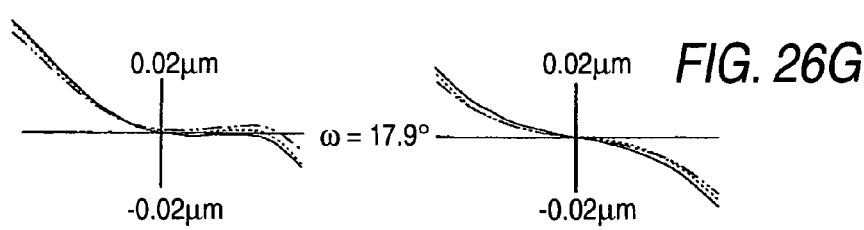
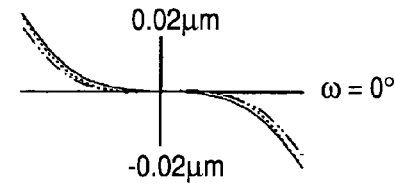

IMAGE READING LENS AND IMAGE READING APPARATUS

BACKGROUND OF THE INVENTION

1. Field of the Invention

The present invention relates to an image reading apparatus such as an image scanner, and an image reading lens to be mounted on the image reading apparatus.

2. Description of Related Art

Image reading apparatuses have been heretofore used. In each of the image reading apparatuses, an image of a color document is formed on a solid-state image sensing device such as a CCD (Charge-Coupled Device) through an optics system so that information of the image is read. In recent years, such image reading apparatuses, particularly image scanners and so on have been requested not only to have higher resolution but also to have a smaller size and lower price.

In this background, an image reading lens having a compact configuration of four lenses by way of example has been developed as an imaging optics to be mounted in an image reading apparatus (for example, see JP-A-11-190820 and JP-A-2002-296499). Each image reading lens disclosed in JP-A-11-190820 and JP-A-2002-296499 is referred to as a telephoto type having a front group including a positive lens and a rear group including a negative lens.

The image reading lenses disclosed in JP-A-11-190820 and JP-A-2002-296499 exhibit excellent optical performance when the angle of view is not larger than about 30°. When the angle of view is larger than 30°, the field curvature increases. It is therefore necessary to secure a distance between the document surface and the image reading lens so that the whole of the document is put within the range of the angle of view not larger than 30°. For this reason, in fact, miniaturization of the total configuration is limited by the dimensions of the document. It is therefore desired to provide an image reading lens which is constituted by a small number of lenses so as to be miniaturized, but can read a larger document.

SUMMARY OF THE INVENTION

An object of an illustrative, non-limiting embodiment of the invention is to provide an image reading lens which exhibits excellent optical performance in a wider angle of view in spite of a compact configuration. Another object of an illustrative, non-limiting embodiment of the invention is to provide an image reading apparatus having the image reading lens.

An image reading lens according to one aspect of the invention includes: in order from an object side of the image reading lens, a first negative lens having a meniscus shape; a second lens having a double-convex shape; an aperture stop; a third positive lens having a meniscus shape with a convex surface on an image side of the image reading lens; and a fourth negative lens having a meniscus shape with a concave surface on the object side.

The image reading lens is constituted by a small number of lenses, that is, four lenses. The first lens located nearest to the object side and the fourth lens located nearest to the image side have negative power. Thus, the image reading lens can be made compact, while the field curvature can be corrected well even in a larger angle of view.

An image reading apparatus according to one aspect of the invention includes the image reading lens.

In the image reading apparatus, image information can be read with high quality through the image reading lens.

It is desired that the image reading lens and the image reading apparatus are designed to satisfy all the following conditional expressions (1) to (5). Assume that f designates a total focal length of the image reading lens; f1 designates a focal length of the first lens; f2 designates a focal length of the second lens; f3 designates a focal length of the third lens; D5 designates a distance on an optical axis between the aperture stop and an object-side surface of the third lens; and D7 designates a distance on the optical axis between an image-side surface of the third lens and an object-side surface of the fourth lens.

$$-1.56 < f1/f < -0.30 \tag{1}$$

$$0.26 < f2/f < 0.45 \tag{2}$$

$$0.20 < f3/f < 2.37 \tag{3}$$

$$0.04 < D5/f < 0.10 \tag{4}$$

$$0.05 < D7/f < 0.15 \tag{5}$$

In the image reading lens and the image reading apparatus, it is desired that the first lens is a negative meniscus lens having a concave surface on the object side. Thus, particularly coma aberration can be corrected well. In this case, it is further desired that the image reading lens and the image reading apparatus are designed to satisfy all the following conditional expressions (6) to (10):

$$-1.56 < f1/f < -1.34 \tag{6}$$

$$0.39 < f2/f < 0.45 \tag{7}$$

$$0.47 < f3/f < 2.37 \tag{8}$$

$$0.04 < D5/f < 0.10 \tag{9}$$

$$0.05 < D7/f < 0.15 \tag{10}$$

In the image reading lens and the image reading apparatus, the first lens may be set as a negative meniscus lens having a concave surface on the image side.

BRIEF DESCRIPTION OF THE DRAWINGS

The features of the invention will appear more fully upon consideration of the exemplary embodiment of the invention, which are schematically set forth in the drawings, in which:

FIG. 4 is an explanatory table showing fundamental data of lens data of an image reading lens as Example 1.

FIG. 5 is an explanatory table showing fundamental data of lens data of an image reading lens as Example 2.

FIG. 6 is an explanatory table showing fundamental data of lens data of an image reading lens as Example 3.

FIG. 7 is an explanatory table showing fundamental data of lens data of an image reading lens as Example 4.

FIG. 8 is an explanatory table showing fundamental data of lens data of an image reading lens as Example 5.

FIG. 9 is an explanatory table showing fundamental data of lens data of an image reading lens as Example 6.

FIG. 10 is an explanatory table showing fundamental data of lens data of an image reading lens as Example 7.

FIG. 11 is an explanatory table showing other fundamental data of lens data of the image reading lenses as Examples 1-7.

FIG. 12 is an explanatory table showing data corresponding to conditional expressions (1)-(10), of lens data of the image reading lenses as Examples 1-7.

FIGS. 20A-20G are diagrams showing coma aberration in the image reading lens of Example 1.

FIGS. 22A-22G are diagrams showing coma aberration in the image reading lens of Example 3.

FIGS. 26A-26G are diagrams showing coma aberration in the image reading lens of Example 7.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, an image reading lens has, in order from an object side of the image reading lens, a first negative lens having a meniscus shape; a second lens having a double-convex shape; an aperture stop; a third positive lens having a meniscus shape with a convex surface on an image side of the image reading lens; and a fourth negative lens having a meniscus shape with a concave surface on the object side. Accordingly, the image reading lens or the image reading apparatus can be made compact, while exhibiting excellent optical performance even in a larger angle of view. Thus, the image reading lens or the image reading apparatus can read a larger document without increasing its total configuration.

In the image reading lens or the image reading apparatus having the image reading lens, the first lens may be set as a negative meniscus lens having a concave surface on the object side. As a result, particularly coma aberration can be corrected well. Further, when the image reading lens or the image reading apparatus is designed to satisfy all the aforementioned conditional expressions (1) to (5), particularly the field curvature can be corrected better.

Exemplary embodiments of the invention will be described below in detail with reference to the drawings.

Figure 1:
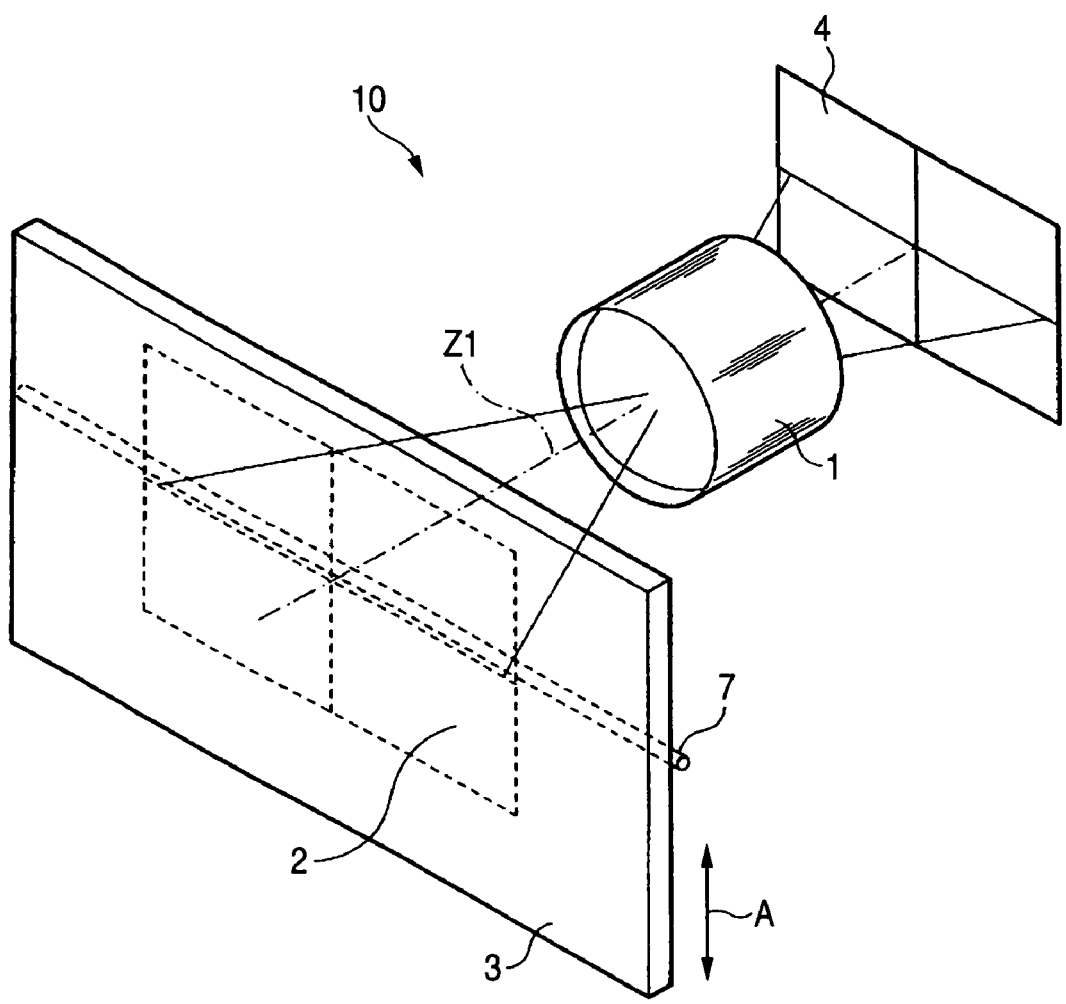
FIG. 1 is a perspective view showing a schematic configuration of an image reading apparatus according to an exemplary embodiment of the invention.

FIG. 1 shows a perspective configuration of an image reading apparatus 10 according to an exemplary embodiment of the invention. The image reading apparatus 10 is an image scanner of a reflection document type, for example, having a document mount 3, a linear light source 7, an imaging device 4, and an image reading lens (hereinafter referred to as "reading lens" simply) 1. For example, an A4 document 2 is mounted on the document mount 3. The light source 7 emits illuminating light to the document 2 on the document mount 3. An image of the document 2 is taken in by the imaging device 4. The reading lens 1 is disposed between the document 2 and the imaging device 4 so as to form an image of the document 2 on an imaging plane of the imaging device 4. In the image reading apparatus 10, for example, all the surface of the document 2 is irradiated by the light source 7 sequentially while the document 2 moves in parallel with and on the document mount 3 and along a direction (designated by the arrow A) perpendicular to the extending direction of the light source 7. Reflected light from the document 2 is imaged on the imaging device 4 by the reading lens 1, and taken in as image information by the imaging device 4.

Figure 2:
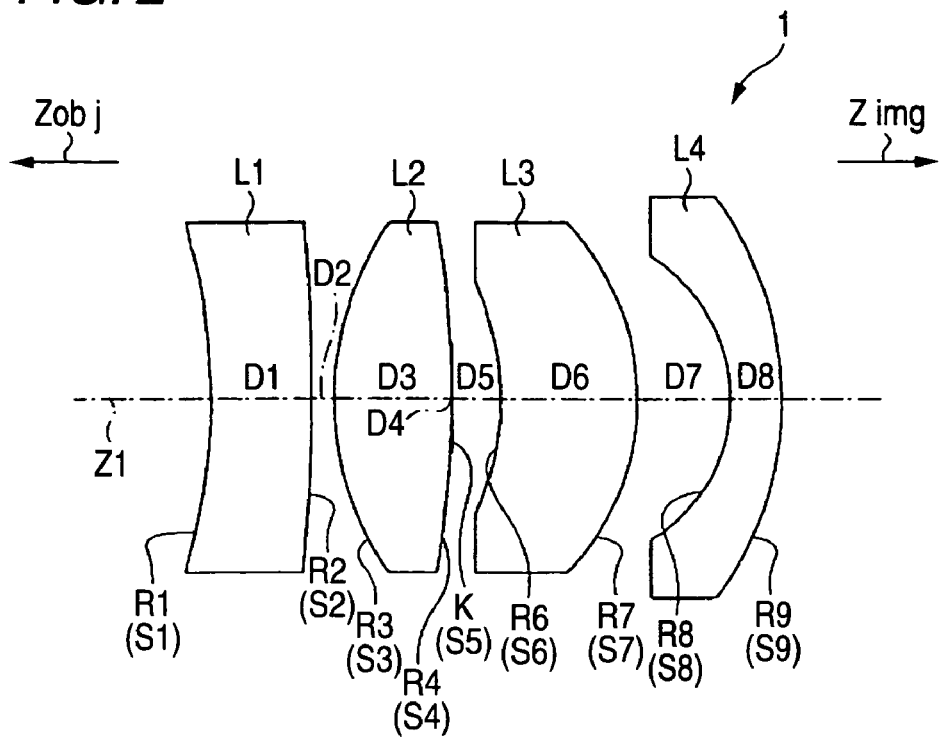
FIG. 2 is a lens sectional view showing an example of the configuration of an image reading lens according to an exemplary embodiment of the invention, corresponding to Example 1.

FIG. 2 shows an example of a configuration of the reading lens 1 as an exemplary embodiment of the invention. In FIG. 2, the side designated by the reference sign Zobj is the object side, that is, the side where the document 2 is mounted and an image to be read is provided. The side designated by the reference sign Zimg is the image side, that is, the side where the imaging device 4 is disposed and an object-side image is formed. The imaging device 4 is disposed so that its imaging plane coincides with an imaging plane Simg of the reading lens 1. The reference sign Si designates an i-th surface on the assumption that the first surface is a surface of a constituent element located nearest to the object side, and the suffix i is given to increase sequentially as the i-th surface Si is nearer to the image side (imaging side). The fifth surface S5 corresponds to an aperture stop K. The reference sign Ri designates the curvature radius of the surface Si. The reference sign Di designates the surface spacing on an optical axis Z1 between the i-th surface Si and the (i+1)-th surface Si+1.

The reading lens 1 includes a first lens L1 with a negative power, a second lens L2 with a positive power, the aperture stop K, a third lens L3 with a positive power and a fourth lens L4 with a negative power, which are disposed in this order from the object side. Specifically, for example, the first lens L1 has a negative meniscus shape having a concave surface on the object side. The second lens L2 has a double-convex shape. The third lens L3 has a meniscus shape having a convex surface on the image side. The fourth lens has a meniscus shape having a concave surface on the object side.

The reading lens 1 is further designed to satisfy all the following conditional expressions (1) to (5). Assume that f designates a total focal length of the reading lens, f1 designates a focal length of the first lens L1, f2 designates a focal length of the second lens L2, f3 designates a focal length of the third lens L3, D5 designates a distance on the optical axis Z1 between the aperture stop K and an object-side surface S6 of the third lens L3, and D7 designates a distance on the optical axis Z1 between an image-side surface S7 of the third lens L3 and an object-side surface S8 of the fourth lens L4.

$$-1.56 < f1/f < -0.30 \quad (1)$$

$$0.26 < f2/f < 0.45 \quad (2)$$

$$0.20 < f3/f < 2.37 \quad (3)$$

$$0.04 < D5/f < 0.10 \quad (4)$$

$$0.05 < D7/f < 0.15 \quad (5)$$

Especially it is desired that the reading lens 1 is designed to satisfy all the following conditional expressions (6) to (10):

$$-1.56 < f1/f < -1.34 \quad (6)$$

$$0.39 < f2/f < 0.45 \quad (7)$$

$$0.47 < f3/f < 2.37 \quad (8)$$

$$0.04 < D5/f < 0.10 \quad (9)$$

$$0.05 < D7/f < 0.15 \quad (10)$$

In the reading lens 1 configured thus, an incident beam from the object side is transmitted from the first lens L1 to the fourth lens L4 sequentially, and imaged on an imaging plane of the imaging device 4. Here, each of the first lens L1 located nearest to the object side and the fourth lens L4 located nearest to the image side has negative power.

Thus, the field curvature can be corrected well even in a larger angle of view. At the same time, the reading lens 1 is constituted by a small number of lenses, that is, four lenses. Thus, the reading lens 1 can be made compact. In addition, the first lens L1 is a meniscus lens having a concave surface on the object side. Particularly coma aberration can be corrected well. Further, the reading lens 1 is designed to satisfy all the conditional expressions (1) to (5). Accordingly, chiefly the field curvature can be corrected well, more advantageously to widening of the angle of view. When the reading lens 1 further satisfies all the conditional expressions (6) to (10), various aberrations such as distortion can be corrected better. The meanings of the conditional expressions (1) to (10) will be described below in detail.

The conditional expressions (1) and (6) are expressions each expressing a proper range of a ratio (f1/f) of the power (1/f1) of the first lens L1 to the power (1/f) of the total system. Here, if the ratio is higher than the upper limit of the conditional expression (1) so that the negative power of the first lens L1 is too strong, the correction of the distortion will be insufficient. Here, particularly if the ratio is made lower than the upper limit of the conditional expression (6), the distortion can be corrected extremely well. On the other hand, if the ratio is lower than the lower limit of the conditional expressions (1) and (6) so that the negative power of the first lens L1 is too weak, the correction of the field curvature will be insufficient.

The conditional expressions (2) and (7) are expressions each expressing a proper range of a ratio (f2/f) of the power (1/f2) of the second lens L2 to the power (1/f) of the total system. Here, if the ratio is higher than the upper limit of the conditional expressions (2) and (7) so that the positive power of the second lens L2 is too weak, the correction of the chromatic aberration on the axis will be insufficient. On the other hand, if the ratio is lower than the lower limit of the conditional expression (2) so that the positive power of the second lens L2 is too strong, the correction of the distortion will be insufficient. Here, particularly if the ratio is made higher than the lower limit of the conditional expression (7), the distortion can be corrected extremely well.

The conditional expressions (3) and (8) are expressions each expressing a proper range of a ratio (f3/f) of the power (1/f3) of the third lens L3 to the power (1/f) of the total system. Here, if the ratio is higher than the upper limit of the conditional expressions (3) and (8) so that the positive power of the third lens L3 is too weak, the correction of the coma aberration will be insufficient. On the other hand, if the ratio is lower than the lower limit of the conditional expression (3) so that the positive power of the third lens L3 is too strong, the correction of the field curvature will be insufficient. Here, particularly if the ratio is made higher than the lower limit of the conditional expression (8), the field curvature can be corrected extremely well.

The conditional expressions (4) and (9) define an air space between the aperture stop K and the object-side surface S6 of the third lens L3. If the ratio is higher than the upper limit of the conditional expressions (4) and (9), the correction of the field curvature will be insufficient unpreferably. If the ratio is lower than the lower limit of the conditional expressions (4) and (9), the correction of the distortion will be insufficient unpreferably.

The conditional expressions (5) and (10) define an air space between the third lens L3 and the fourth lens L4. If the ratio is higher than the upper limit of the conditional expressions (5) and (10), the correction of the coma aberration will be insufficient unpreferably. If the ratio is lower than the lower limit of the conditional expressions (5) and (10), the correction of the field curvature will be insufficient unpreferably.

Thus, according to the reading lens 1 in this embodiment, the first negative lens L1, the second lens L2 having a double-convex shape, the aperture stop K, the third positive lens L3 having a meniscus shape having a convex surface on the image side, and the fourth negative lens L4 having a meniscus shape having a concave surface on the object side are disposed in this order from the object side. The angle of view can be widened in spite of the compact configuration. Particularly since the first lens L1 is set as a negative meniscus lens having a concave surface on the object side, particularly the coma aberration can be corrected well. Further, since the reading lens 1 is designed to satisfy all the conditional expressions (1) to (5), the field curvature can be corrected better, advantageously to widening of the angle of view. Thus, the reading lens 1 can read a larger document without increasing its total configuration.

<Modification>

Figure 3:
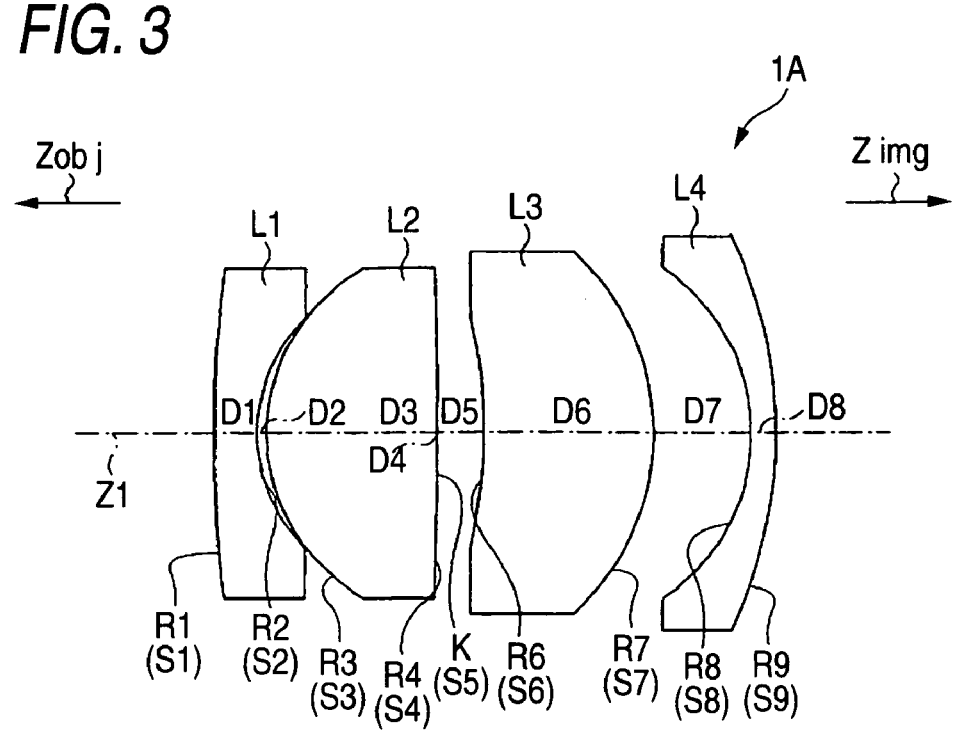
FIG. 3 is a lens sectional view showing another example of the configuration of the image reading lens according to an exemplary embodiment of the invention, corresponding to Example 7.

An image reading lens (hereinafter referred to as "reading lens" simply) 1A as a modification of the aforementioned embodiment will be described below with reference to FIG. 3. FIG. 3 shows an example of the configuration of the reading lens 1A. In the reading lens 1 (FIG. 2) according to the aforementioned embodiment, the first lens L1 is formed into a negative meniscus shape having a concave surface on the object side. On the other hand, the reading lens 1A is formed to have the first lens L1 as a negative meniscus lens having a convex surface on the object side. The second to fourth lenses L2 to L4 are configured in the same manner as in the reading lens 1. It is also desired that the reading lens 1A is designed to satisfy all the conditional expressions (1) to (5). The reading lens 1A configured thus can also obtain a wider angle of view in spite of its compact configuration.

Next, specific numerical examples of image reading lenses according to the embodiments will be described.

First to seventh numerical examples (Examples 1 to 7) will be described together below.

FIG. 4 shows fundamental lens data about an image reading lens as Example 1, which corresponds to the lens sectional configuration shown in FIG. 2. In the field of a surface number Si in FIG. 4, the number of an i-th (i=1 to 9) surface is shown on the assumption that the first surface is a surface of a constituent element located nearest to the object side, and the suffix i is given to increase sequentially as the i-th surface is nearer to the image side (imaging side), correspondingly to the reference sign Si shown in FIG. 2. The fifth surface S5 corresponds to the aperture stop K. In the field of a curvature radius Ri, the curvature radius of the i-th surface from the object side is shown correspondingly to the reference sign Ri shown in FIG. 2. In the field of a surface spacing Di, the spacing on an optical axis between the i-th surface Si and the (i+1)-th surface Si+1 from the object side is shown correspondingly to the reference sign Di shown in FIG. 2. The values of the curvature radius Ri and the surface spacing Di are expressed by units of millimeters (mm). In the fields of Ndj and vdj, a refractive index and an Abbe number of a j-th (j=1 to 4) lens element from the object side for a d-line (587.6 nm) are shown respectively. In the same manner, fundamental lens data of image reading lenses according to Examples 2 to 6 are shown in FIGS. 5 to 9 respectively. Examples 2 to 6 have almost the same configuration as the lens sectional configuration of Example 1 shown in FIG. 2. Here, illustrations of Examples 2 to 6 are omitted.

Further, FIG. 10 shows fundamental lens data of an image reading lens as Example 7, which corresponds to the lens sectional configuration of FIG. 3. Each reference sign is similar to that in FIG. 4.

FIG. 11 shows the focal length f of the total system, the F-number, the magnification β and the view angle 2ω collectively as data about each image reading lens according to Examples 1-7. The focal length f is expressed by units of millimeters (mm).

FIG. 12 shows values corresponding to the conditional expressions (1) to (10) for the image reading lenses according to Examples 1-7. A shown in FIG. 12, values in each example are within the numerical ranges of the conditional expressions (1) to (5). Particularly values in Examples 1-6 are within the numerical ranges of the conditional expressions (6) to (10).

Figure 13A:
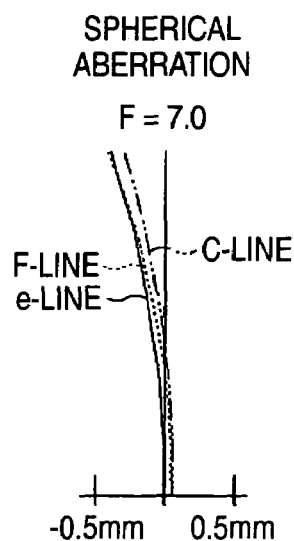
FIGS. 13A-13C are diagrams showing spherical aberration, astigmatism and distortion in the image reading lens of Example 1.
Figure 13B:
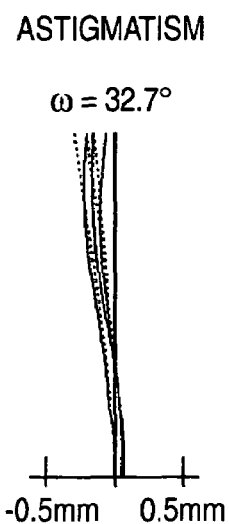
Figure 13C:
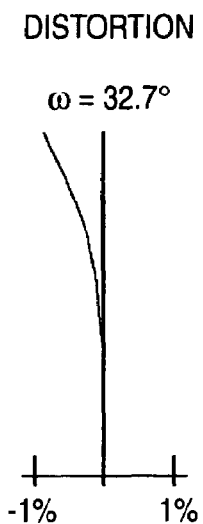
Figure 14A:
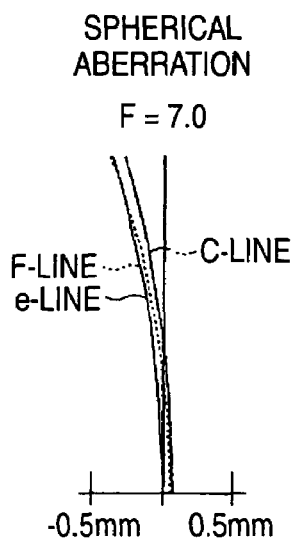
FIGS. 14A-14C are diagrams showing spherical aberration, astigmatism and distortion in the image reading lens of Example 2.
Figure 14B:
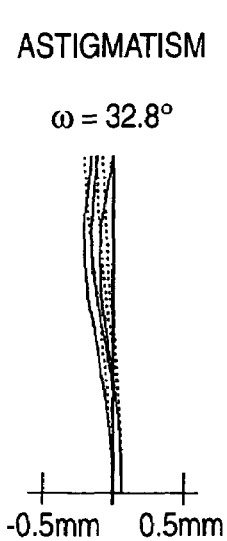
Figure 14C:
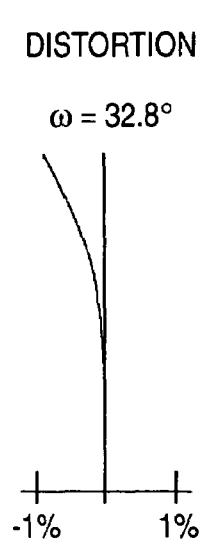
Figure 15A:
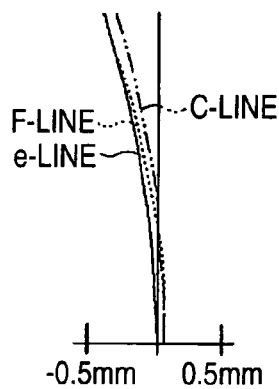
FIGS. 15A-15C are diagrams showing spherical aberration, astigmatism and distortion in the image reading lens of Example 3.
Figure 15B:
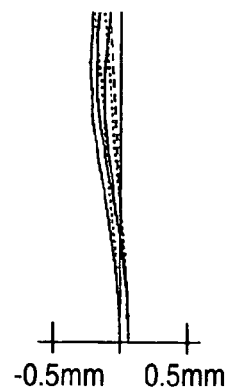
Figure 15C:
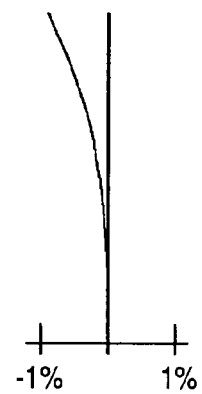
Figure 16A:
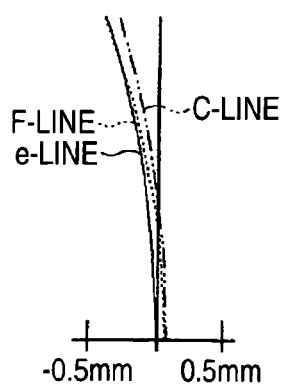
FIGS. 16A-16C are diagrams showing spherical aberration, astigmatism and distortion in the image reading lens of Example 4.
Figure 16B:
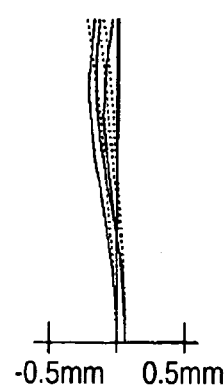
Figure 16C:
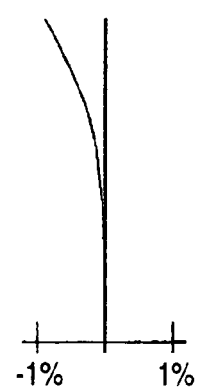
Figure 17A:
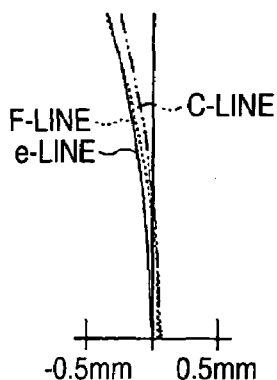
FIGS. 17A-17C are diagrams showing spherical aberration, astigmatism and distortion in the image reading lens of Example 5.
Figure 17B:
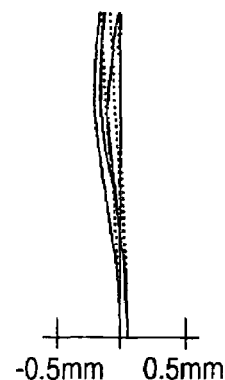
Figure 17C:
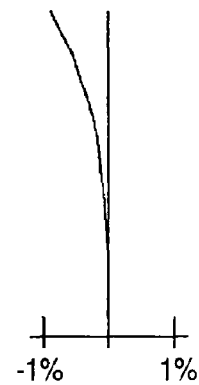
Figure 18A:
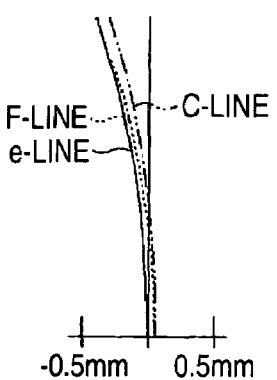
FIGS. 18A-18C are diagrams showing spherical aberration, astigmatism and distortion in the image reading lens of Example 6.
Figure 18B:
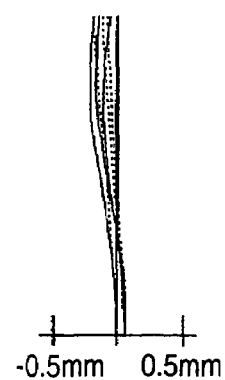
Figure 18C:
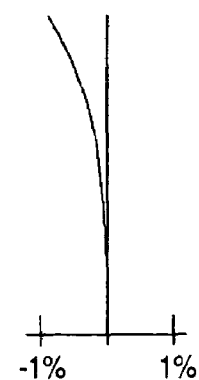
Figure 19A:
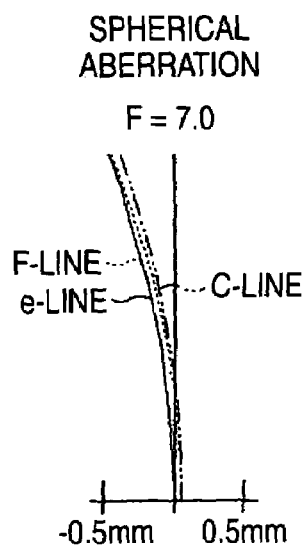
FIGS. 19A-19C are diagrams showing spherical aberration, astigmatism and distortion in the image reading lens of Example 7.
Figure 19B:
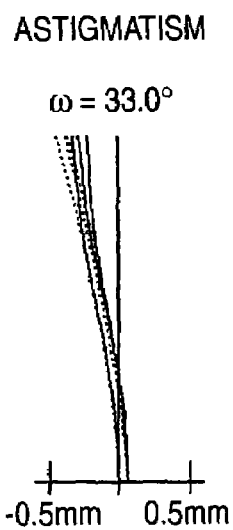
Figure 19C:
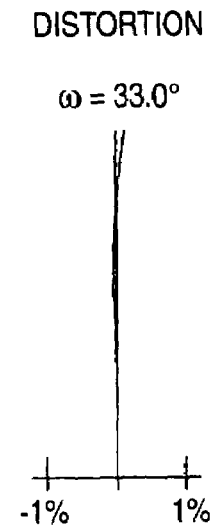
Figure 21A:
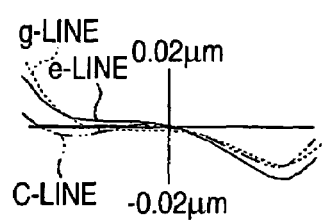
FIGS. 21A-21G are diagrams showing coma aberration in the image reading lens of Example 2.
Figure 21E:
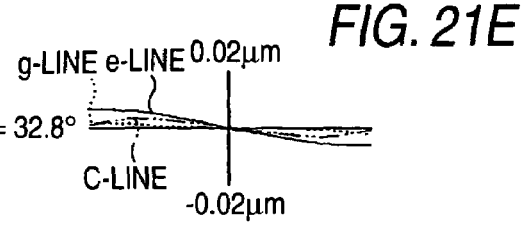
Figure 21B:
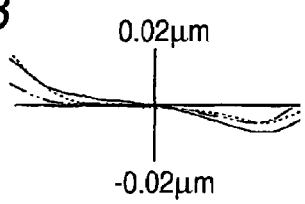
Figure 21F:
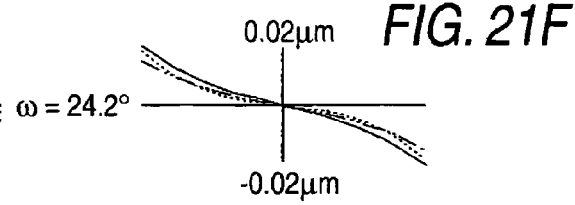
Figure 21C:
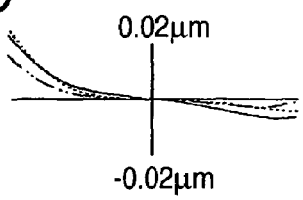
Figure 21G:
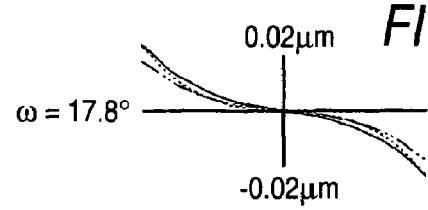
Figure 21D:
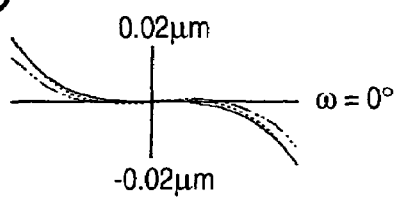
Figure 23A:
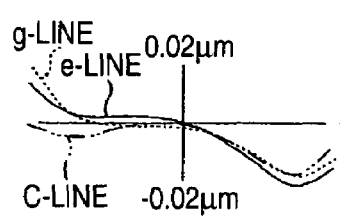
FIGS. 23A-23G are diagrams showing coma aberration in the image reading lens of Example 4.
Figure 23E:
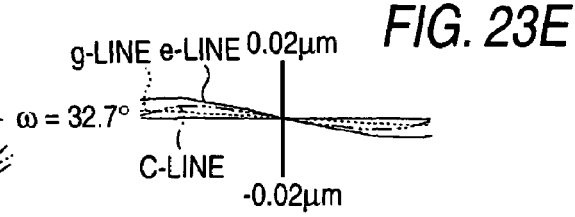
Figure 23B:
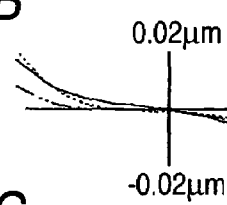
Figure 23F:
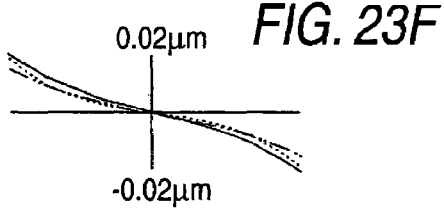
Figure 23C:
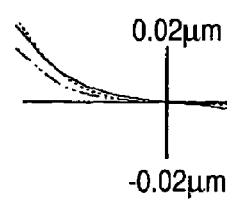
Figure 23G:
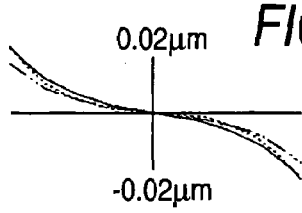
Figure 23D:
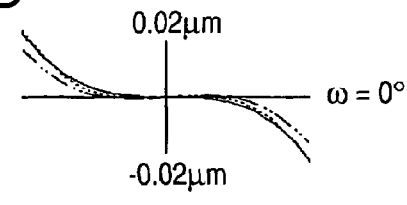
Figure 24A:
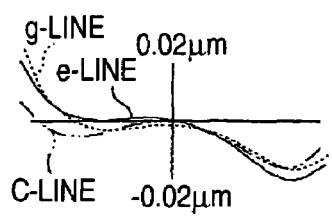
FIGS. 24A-24G are diagrams showing coma aberration in the image reading lens of Example 5.
Figure 24B:
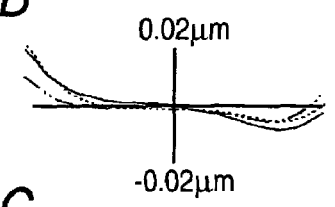
Figure 24C:
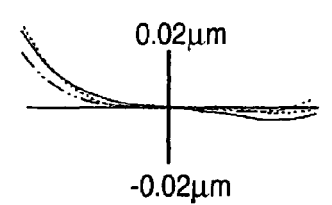
Figure 24D:
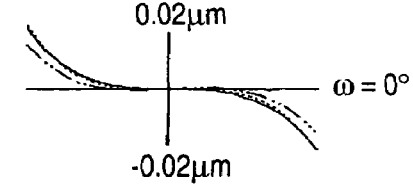
Figure 24E:
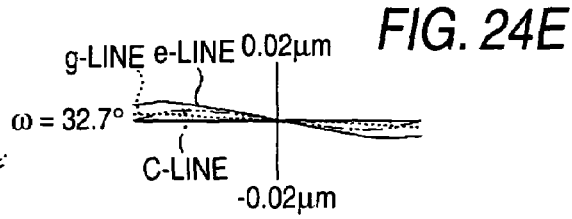
Figure 24F:
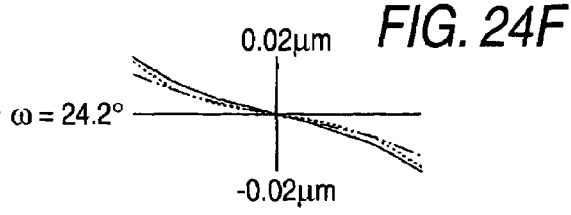
Figure 24G:
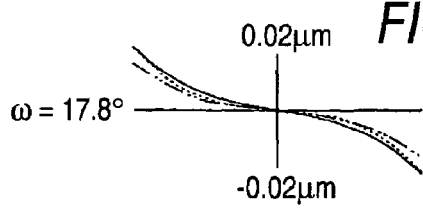
Figure 25A:
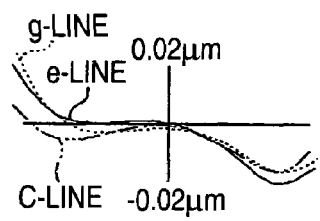
FIGS. 25A-25G are diagrams showing coma aberration in the image reading lens of Example 6.
Figure 25E:
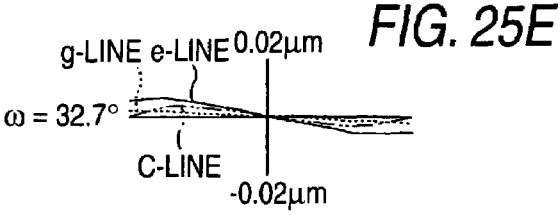
Figure 25B:
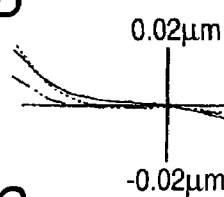
Figure 25F:
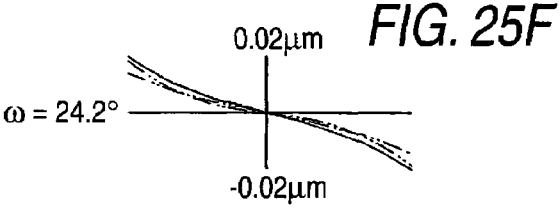
Figure 25C:
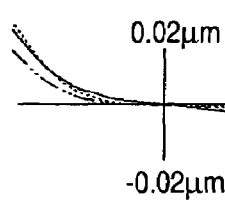
Figure 25G:
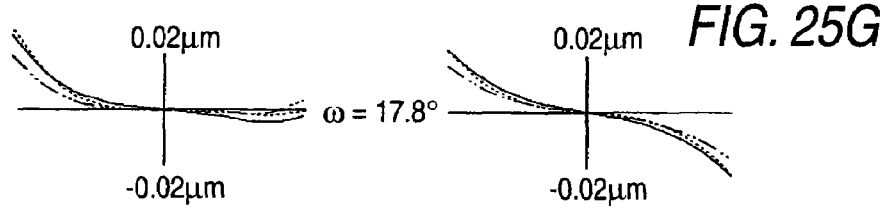
Figure 25D:
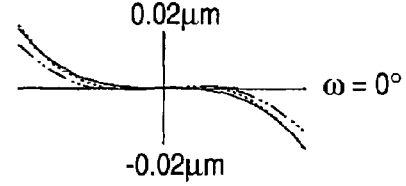

FIGS. 13A-13C show spherical aberration, astigmatism and distortion in the image reading lens of Example 1 respectively. Aberrations at the e-line (wavelength 546.1 nm), the g-line (wavelength 435.8 nm) and the C-line (wavelength 656.3 nm) are shown in the spherical aberration diagram of FIG. 13A and the astigmatism diagram of FIG. 13B. An aberration at the e-line is shown in the distortion diagram of FIG. 13C. In the astigmatism diagram, the solid line designates aberration in a sagittal direction and the broken line designates aberration in a tangential direction. Each aberration diagram shows data obtained in the following case. That is, in an optical path from an object surface to an image plane, a glass plate (parallel-plane plate) 2.8 mm thick is disposed on the object side with respect to the image reading lens, and a glass plate (parallel-plane plate) 0.7 mm thick is disposed on the image side likewise. The reference sign F designates an F-number, and ω designates a half angle of view. In the same manner, FIGS. 14A-14C, 15A-15C, 16A-16C, 17A-17C, 18A-18C and 19A-19C show spherical aberrations, astigmatisms and distortions in the image reading lenses of Examples 2-7 respectively.

FIGS. 20A-20G show coma aberrations in respective half angles of view in the image reading lens according to Example 1. Particularly FIGS. 20A-20D show tangential coma aberrations, and FIGS. 20E-20G show sagittal coma aberrations. Here, coma aberrations corresponding to the e-line, the g-line and the C-line are shown.

In the same manner, FIGS. 21A-21G show coma aberrations in Example 2, FIGS. 22A-22G show coma aberrations in Example 3, FIGS. 23A-23G show coma aberrations in Example 4, FIGS. 24A-24G show coma aberrations in Example 5, FIGS. 25A-25G show coma aberrations in Example 6, and FIGS. 26A-26G show coma aberrations in Example 7.

As is apparent from the aforementioned lens data and the aforementioned aberration diagrams, in each example, it was confirmed that good aberration correction could be attained over a wider range of the angle of view in spite of a compact configuration so that performance good enough to read an image could be obtained. Particularly in Examples 1-6, the first lens L1 was a negative meniscus lens having a concave surface on the object side, so that the coma aberration could be corrected better.

The invention has been described above along some embodiments and examples. The invention is not limited to the embodiments and examples, but various modifications can be made thereon. For example, the values of the curvature radius, the surface spacing and the refractive index of each lens element are not limited to those shown in any numerical example. They can take other values.

Figure 27:
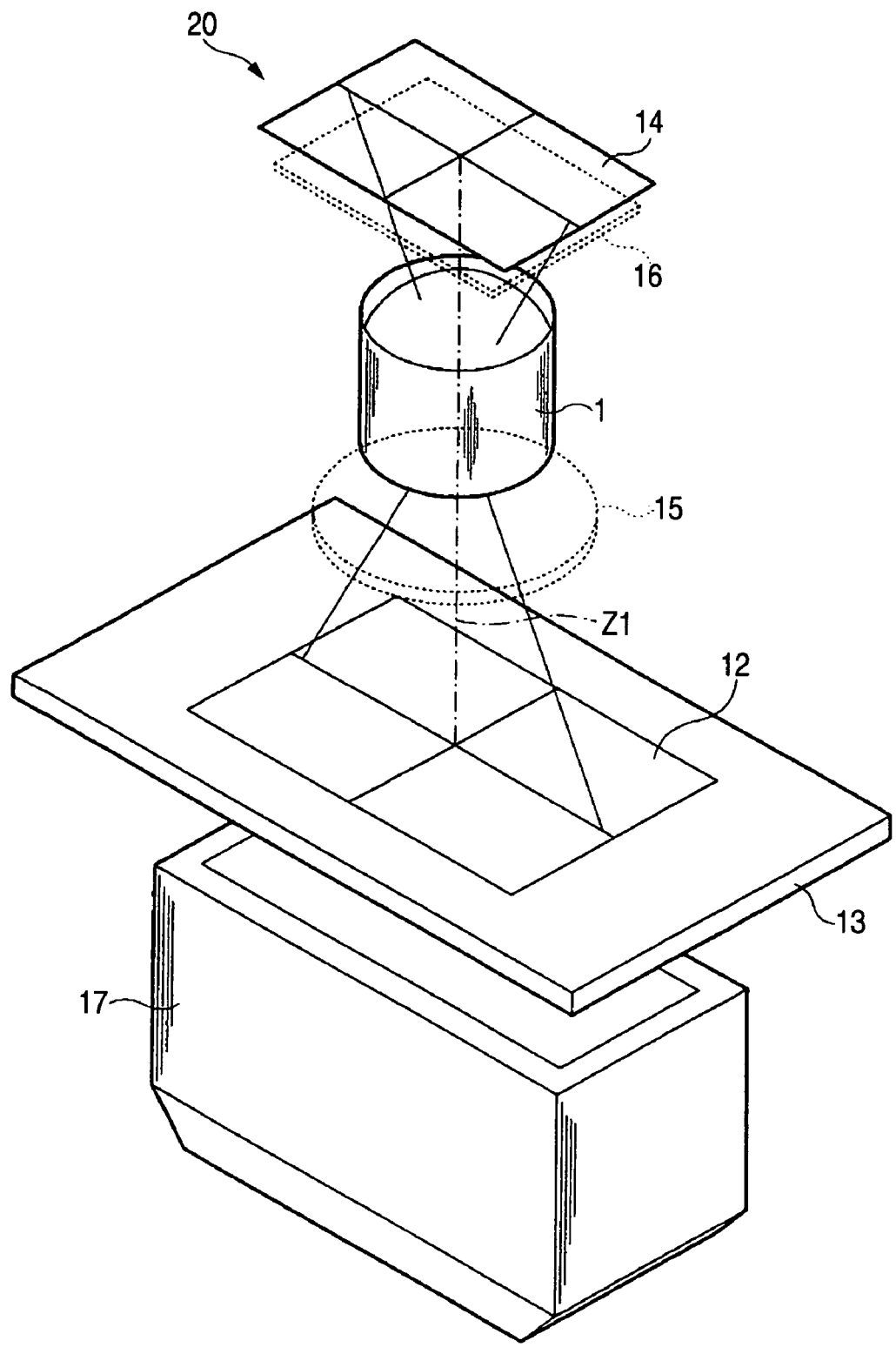
FIG. 27 is a configuration view showing a modification of the image reading apparatus according to an exemplary embodiment of the invention.

In the aforementioned embodiments and examples, image reading apparatus was of a reflection document type. The invention is not limited to this. For example, the image reading apparatus may be of a transparent document type as shown in FIG. 27. An image reading apparatus 20 shown in FIG. 27 has a document mount 13 on which a transparent document 12 such as a negative film or a positive film will be mounted, a light source 17 which emits illuminating light to the document mount 13, an imaging device 14 which takes an image of the transparent document 12, and an image reading lens 1 which forms the image of the transparent document 12 on an image plane of the imaging device 14. The imaging device 14 is, for example, constituted by a CCD or the like. In the image reading apparatus 20, an optical element 15 such as a document press glass or filter for pressing the transparent document 12 onto the document mount 13 is disposed between the transparent document 12 and the reading lens 1 in accordance with necessity. In addition, an optical element 16 such as a cover glass for protecting the imaging device 14 may be disposed between the reading lens 1 and the imaging device 14 in accordance with necessity. In the image reading apparatus 20, the transparent document 12 is irradiated with illuminating light from the light source 17. Light transmitted through the transparent document 12 is imaged on the imaging device 14 by the reading lens 1. Thus, an image is acquired by the imaging device 14.

The present application claims foreign priority based on Japanese Patent Application No. JP2005-314725 filed Oct. 28 of 2005, the contents of which is incorporated herein by reference.

What is claimed is:

1. An image reading lens comprising:
in order from an object side of the image reading lens,
a first negative lens having a meniscus shape;
a second lens having a double-convex shape in which an object side-surface of the second lens has a smaller absolute value of a radius of curvature than that of an image-side surface of the second lens;

an aperture stop;

a third positive lens having a meniscus shape with a convex surface on an image side of the image reading lens; and a fourth negative lens having a meniscus shape with a concave surface on the object side.

2. The image reading lens according to claim 1, which satisfies conditional expressions (1) to (5):

$$-1.56 < f1/f < -0.30 \quad (1)$$

$$0.26 < f2/f < 0.45 \quad (2)$$

$$0.20 < f3/f < 2.37 \quad (3)$$

$$0.04 < D5/f < 0.10 \quad (4)$$

$$0.05 < D7/f < 0.15 \quad (5)$$

wherein f designates a total focal length of the image reading lens;

f1 designates a focal length of the first lens;

f2 designates a focal length of the second lens;

f3 designates a focal length of the third lens;

D5 designates a distance on an optical axis between the aperture stop and an object-side surface of the third lens; and D7 designates a distance on the optical axis between an image-side surface of the third lens and an object-side surface of the fourth lens.

3. The image reading lens according to claim 1, wherein the first lens is a negative meniscus lens having a concave surface on the image side.

4. An image reading apparatus comprising an image reading lens according to claim 1.

5. The image reading lens according to claim 1, wherein all surfaces of the first, second, third, and fourth lenses are spherical.

6. An image reading lens comprising:

in order from an object side of the image reading lens, a first negative lens having a meniscus shape;

a second lens having a double-convex shape;

an aperture stop;

a third positive lens having a meniscus shape with a convex surface on an image side of the image reading lens; and a fourth negative lens having a meniscus shape with a concave surface on the object side, wherein the first lens is a negative meniscus lens having a concave surface on the object side.

7. The image reading lens according to claim 6, which satisfies conditional expressions (6) to (10):

$$-1.56 < f1/f < -1.34 \quad (6)$$

$$0.39 < f2/f < 0.45 \quad (7)$$

$$0.47 < f3/f < 2.37 \quad (8)$$

$$0.04 < D5/f < 0.10 \quad (9)$$

$$0.05 < D7/f < 0.15 \quad (10)$$

wherein f designates a total focal length of the imaging reading lens;

f1 designates a focal length of the first lens;

f2 designates a focal length of the second lens;

f3 designates a focal length of the third lens;

D5 designates a distance on an optical axis between the aperture stop and an object-side surface of the third lens; and D7 designates a distance on the optical axis between an image-side surface of the third lens and an object-side surface of the fourth lens.

8. The image reading lens according to claim 6, wherein all surfaces of the first, second, third, and fourth lenses are spherical.

* * * * *